(12) United States Patent
Lee et al.

(10) Patent No.: US 8,781,036 B1
(45) Date of Patent: **\*Jul. 15, 2014**

(54) SYSTEM WITH GAIN BASED PREAMBLE SEQUENCE ESTIMATION

(71) Applicant: Marvell International Ltd., Hamilton (BM)

(72) Inventors: Jungwon Lee, San Diego, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/686,478

(22) Filed: Nov. 27, 2012

Related U.S. Application Data

(63) Continuation of application No. 13/214,817, filed on Aug. 22, 2011, now Pat. No. 8,320,508, which is a continuation of application No. 11/725,039, filed on Mar. 16, 2007.

(60) Provisional application No. 60/826,392, filed on Sep. 21, 2006, provisional application No. 60/809,733, filed on May 31, 2006, provisional application No. 60/783,300, filed on Mar. 17, 2006.

(51) Int. Cl.
*H04L 27/06* (2006.01)

(52) U.S. Cl.
USPC ........... 375/342; 375/260; 375/267; 375/299; 375/340; 375/354; 375/368; 455/101; 455/132; 455/500; 455/502; 370/210; 370/480; 370/503; 370/509; 370/510; 327/141

(58) Field of Classification Search
USPC ......... 375/260, 267, 299, 340, 342, 354, 368; 455/101, 132, 500, 502; 370/210, 480, 370/503, 509, 510; 327/141
See application file for complete search history.

(56) References Cited

U.S. PATENT DOCUMENTS

| 6,909,760 | B2 | 6/2005 | Borowski et al. |
| 7,339,981 | B2 | 3/2008 | Dogan |
| 7,634,034 | B2 | 12/2009 | Larsson |
| 2001/0028637 | A1 | 10/2001 | Abeta et al. |
| 2003/0016621 | A1 | 1/2003 | Li |
| 2005/0095985 | A1 | 5/2005 | Hafeoz |
| 2005/0128987 | A1 | 6/2005 | Liang |

(Continued)

OTHER PUBLICATIONS

IEEE Std 802.16—2004 (Revision of IEEE Std 802.16—2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

(Continued)

*Primary Examiner* — Leon Flores

(57) ABSTRACT

A system including an input module, a first gain module, a second gain module, and a preamble estimation module. The input module is configured to receive an input signal from a station. The input signal includes (i) a first preamble sequence, and (ii) subcarriers. The first gain module is configured to, based on the input signal, generate first channel gain values. Each of the first channel gain values is for a respective one of the subcarriers. A second gain module is configured to, based on the first channel gain values, generate second channel gain values. A preamble estimation module is configured to estimate the first preamble sequence based on (i) the first channel gain values, and (ii) the second channel gain values.

20 Claims, 14 Drawing Sheets

(56) References Cited

U.S. PATENT DOCUMENTS

| | | |
|---|---|---|
| 2006/0025079 A1 | 2/2006 | Sutskover et al. |
| 2006/0203710 A1 | 9/2006 | Mukkavilli et al. |
| 2006/0233097 A1 | 10/2006 | Vrcelj et al. |
| 2007/0165726 A1 | 7/2007 | Ding et al. |
| 2007/0183370 A1 | 8/2007 | Wallace et al. |
| 2010/0104040 A1 | 4/2010 | Seki |

OTHER PUBLICATIONS

IEEE Transactions on Broadcasting, vol. 48. No. 3, Sep. 2002 "Channel Estimation Techniques Based on Pilot Arrangement in OFDM Systems"; Sinem Coleri, Mustafa Ergen, Ajnu Puri, and Ahmad Bahal; pp. 223-229.

"A Low Complexity ML Channel Estimator for OFDM"; Luc Deneire, Patrick Vandenameele, Liesbet van de Perre, Bert Gyselinckx, Marc Engels; 5 Pages.

In IEEE Transactions on Communications, vol. 46 No. 7, pp. 931-939, Jul. 1998. "OFDM Channel Estimation by Singular Value Decomposition"; Ove Edfors, Magnus Sandell, Jan-Jaap van de Beek, Sarah Kate Wilson, and Per Ola Borjesson; Lulea University of Technology—Division of Signal Processing.

Rec. ITU-R M. 1225; Recommendation ITU-R M.1225; Guidelines for Evaluation of Radio Transmission Technologies for IMT-2000; (Question ITU-R 39/8); 1997. pp. 1-61.

IEEE Transactions on Communications, vol. 46, No. 7, Jul. 1998. "Robust Channel Estimation for OFDM Systems with Rapid Dispersive Fading Channels"; Ye (Geoffrey) Li, Senior Member, IEEE, Leonard J. Cimini, Jr., Senior Member, IEEE, and Nelson R. Sollenberger, Fellow, IEEE. pp. 902-915.

Preamble modulation series per segment and IDcell
for the 1K FFT mode

| Index | IDcell | Segment | Series to modulate (in hexadecimal format) |
|---|---|---|---|
| 0 | 0 | 0 | 0xA6F294537B285E1844677D133E4D53CCB1F182DE00489E53E6B6E77065C7EE7D0ADBEAF |
| 1 | 1 | 0 | 0x668321CBBE7F462E6C2A07E8BBDA2C7F7946D5F69E35AC8ACF7D64AB4A33C467001F3B2 |
| 2 | 2 | 0 | 0x1C75D30B2DF72CEC9117A0BD8EAF8E050246IFC07456AC906ADE03E9B5AB5E1D3F98C6E |
| 3 | 3 | 0 | 0x5F9A2E5CA7CC69A522710 4FB1CC22628 09F3B10D0542B9B1DFDA4A73A7046096DF0E8D3D |
| 4 | 4 | 0 | 0x82F8A0AB918138D84BB86224F6C342D81BC8BFE791CA9EB54096159D572E91C6E11302F |
| 5 | 5 | 0 | 0xEE27E59B84CCF15BB1565EF90D478CD2C49EE8A70DE36S6EED7C9420B0C6FFAF9AF035FC |
| 6 | 6 | 0 | 0xC1DF5AE28D1CA6A8917BCDAF4E73BD93F931C44F93C3F12F0132FB643EFD5885C8B2BCB |
| 7 | 7 | 0 | 0xFCA36CCCCF7F3E0602696DF745A68DB948C57DFA9575BEA1F05725C42155898F0A63A248 |

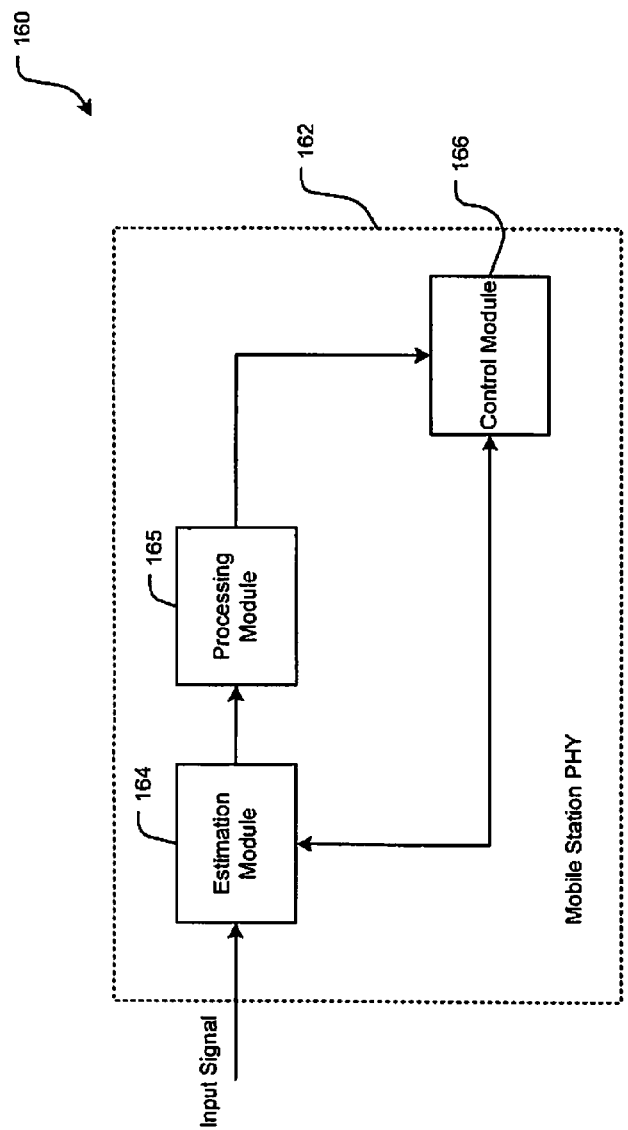

SYSTEM WITH GAIN BASED PREAMBLE SEQUENCE ESTIMATION

CROSS-REFERENCE TO RELATED APPLICATIONS

This present disclosure is a continuation of U.S. application Ser. No. 13/214,817, filed on Aug. 22, 2011, which is a continuation of U.S. application Ser. No. 11/725,039, filed on Mar. 16, 2007, which claims priority under 35 U.S.C. §119(e) to U.S. Provisional Application No. 60/783,300, filed on Mar. 17, 2006, U.S. Provisional Application No. 60/809,733, filed on May 31, 2006, and U.S. Provisional Application No. 60/826,392, filed on Sep. 21, 2006. The entire disclosures of the applications referenced above are incorporated herein by reference.

FIELD

The present disclosure relates to communication systems, and more particularly to joint estimation of channel and preamble sequences in systems using orthogonal frequency domain multiplexing (OFDM).

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Referring now to FIG. 1, a typical communication system 10 includes an information source 12, a transmitter 13, a communication channel 20, a receiver 27, and a destination 28. The transmitter 13 includes a source encoder 14, a channel encoder 16, and a modulator 18. The receiver 27 includes a demodulator 22, a channel decoder 24, and a source decoder 26.

The information source 12 may be an analog source such as a sensor that outputs information as continuous waveforms or a digital source such as a computer that outputs information in a digital form. The source encoder 14 converts the output of the information source 12 into a sequence of binary digits (bits) called an information sequence u. The channel encoder 16 converts the information sequence u into a discrete encoded sequence v called a codeword. The modulator 18 transforms the codeword into a waveform of duration T seconds that is suitable for transmission.

The waveform output by the modulator 18 is transmitted via the communication channel 20. Typical examples of the communication channel 20 are telephone lines, wireless communication channels, optical fiber cables, etc. Noise, such as electromagnetic interference, inter-channel crosstalk, etc., may corrupt the waveform.

The demodulator 22 receives the waveform. The demodulator 22 processes each waveform and generates a received sequence r that is either a discrete (quantized) or a continuous output. The channel decoder 24 converts the received sequence r into a binary sequence u' called an estimated information sequence. The source decoder 26 converts u' into an estimate of the output of the information source 12 and delivers the estimate to the destination 28. The estimate may be a faithful reproduction of the output of the information source 12 when u' resembles u despite decoding errors that may be caused by the noise.

Communication systems use different modulation schemes to modulate and transmit data. For example, a radio frequency (RF) carrier may be modulated using techniques such as frequency modulation, phase modulation, etc. In wireline communication systems, a transmitted signal generally travels along a path in a transmission line between a transmitter and a receiver. In wireless communication systems, however, a transmitted signal may travel along multiple paths. This is because the transmitted signal may be reflected and deflected by objects such as buildings, towers, airplanes, cars, etc., before the transmitted signal reaches a receiver. Each path may be of different length. Thus, the receiver may receive multiple versions of the transmitted signal. The multiple versions may interfere with each other causing inter symbol interference (ISI). Thus, retrieving original data from the transmitted signal may be difficult.

To alleviate this problem, wireless communication systems often use a modulation scheme called orthogonal frequency division multiplexing (OFDM). In OFDM, a wideband carrier signal is converted into a series of independent narrowband sub-carrier signals that are adjacent to each other in frequency domain. Data to be transmitted is split into multiple parallel data streams. Each data stream is modulated using a sub-carrier. A channel over which the modulated data is transmitted includes a sum of the narrowband sub-carrier signals, which may overlap.

When each sub-carrier closely resembles a rectangular pulse, modulation can be easily performed by Inverse Discrete Fourier Transform (IDFT), which can be efficiently implemented as an Inverse Fast Fourier Transform (IFFT). When IFFT is used, the spacing of sub-carriers in the frequency domain is such that when the receiver processes a received signal at a particular frequency, all other signals are nearly zero at that frequency, and ISI is avoided. This property is called orthogonality, and hence the modulation scheme is called orthogonal frequency division multiplexing (OFDM).

Referring now to FIGS. 2A-2C, a wireless communication system 50 may include base stations BS1, BS2, and BS3 (collectively BS) and one or more mobile stations (MS). Each BS may include a processor 30, a medium access controller (MAC) 32, a physical layer (PHY) module 34, and an antenna 36 as shown in FIG. 2B. Similarly, each MS may include a processor 40, a medium access controller (MAC) 42, a physical layer (PHY) module 44, and an antenna 46 as shown in FIG. 2C. The PHY modules 34 and 44 may include radio frequency (RF) transceivers (not shown) that transmit and receive data via antennas 36 and 46, respectively. Each BS and MS may transmit and receive data while the MS moves relative to the BS.

Specifically, each BS may transmit data using orthogonal frequency division multiplexing access (OFDMA) system. Each BS may transmit data typically in three segments: SEG1, SEG2, and SEG3. The MS, which moves relative to each BS, may receive data from one or more base stations depending on the location of the MS relative to each BS. For example, the MS may receive data from SEG 3 of BS1 and SEG 2 of BS2 when the MS is located as shown in FIG. 2A.

Relative motion between MS and BS may cause Doppler shifts in signals received by the MS. This can be problematic since systems using OFDMA are inherently sensitive to carrier frequency offsets (CFO). Therefore, pilot tones are generally used for channel estimation refinement. For example, some of the sub-carriers may be designated as pilot tones for correcting residual frequency offset errors.

Additionally, the PHY module 34 of each BS typically adds a preamble to a data frame that is to be transmitted. Specifically, the PHY module 34 modulates and encodes the data frame including the preamble at a data rate specified by the MAC 34 and transmits the data frame. When the PHY module 44 of the MS receives the data frame, the PHY module 44 uses the preamble in the data frame to detect a beginning of packet transmission and to synchronize to a transmitter clock of the BS.

According to the I.E.E.E. standard 802.16e, which is incorporated herein by reference in its entirety, a first symbol in the data frame transmitted by the BS is a preamble symbol from a preamble sequence. The preamble sequence typically contains an identifier called IDcell, which is a cell ID of the BS, and segment information. The BS selects the preamble sequence based on the IDcell and the segment number of the BS. Each BS may select different preamble sequences. Additionally, each BS may select preamble sequences that are distinct among the segments of that BS.

The BS modulates multiple sub-carriers with the selected preamble sequence. Thereafter, the BS performs IFFT, adds a cyclic prefix, and transmits a data frame. The MS uses the cyclic prefix to perform symbol timing and fractional carrier frequency synchronization. Unless the MS knows the preamble sequence, however, the MS cannot associate itself to a particular segment of a particular BS.

SUMMARY

A system is provided and includes an input module, a first gain module, a second gain module, and a preamble estimation module. The input module is configured to receive an input signal from a station. The input signal includes (i) a first preamble sequence, and (ii) subcarriers. The first gain module is configured to, based on the input signal, generate first channel gain values. Each of the first channel gain values is for a respective one of the subcarriers. A second gain module is configured to, based on the first channel gain values, generate second channel gain values. A preamble estimation module is configured to estimate the first preamble sequence based on (i) the first channel gain values, and (ii) the second channel gain values.

In other features, a method is provided and includes receiving an input signal at a first station. The input signal includes (i) a first preamble sequence, and (ii) subcarriers. Based on the input signal, first channel gain values are generated. Each of the first channel gain values is for a respective one of the subcarriers. Based on the first channel gain values, second channel gain values are generated. The first preamble sequence is estimated based on (i) the first channel gain values, and (ii) the second channel gain values.

In general, in one aspect, this disclosure describes a system including an estimation module, a processing module, and a control module. The estimation module is configured to generate a first set of channel estimates for a plurality of subcarriers of a received signal. The processing module is configured to generate a second set of channel estimates for the plurality of subcarriers, in which the second set of channel estimates are generated based on the first set of channel estimates. The control module is configured to estimate a preamble sequence in the received signal based on each of (i) the first set of channel estimates and (ii) the second set of channel estimates.

In general, in another aspect, this disclosure describes a method including: generating a first set of channel estimates for a plurality of subcarriers of a signal received by a mobile station; generating a second set of channel estimates for the plurality of subcarriers, in which the second set of channel estimates are based on the first set of channel estimates. The method further includes estimating a preamble sequence in the signal received by the mobile station based on each of (i) the first set of channel estimates and (ii) the second set of channel estimates.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a table showing preamble sequences used by base stations of FIG. 3 to transmit data;

FIG. 5A is a functional block diagram of an exemplary system for jointly estimating channel gain and preamble sequence according to the present disclosure;

DETAILED DESCRIPTION

Figure 1:
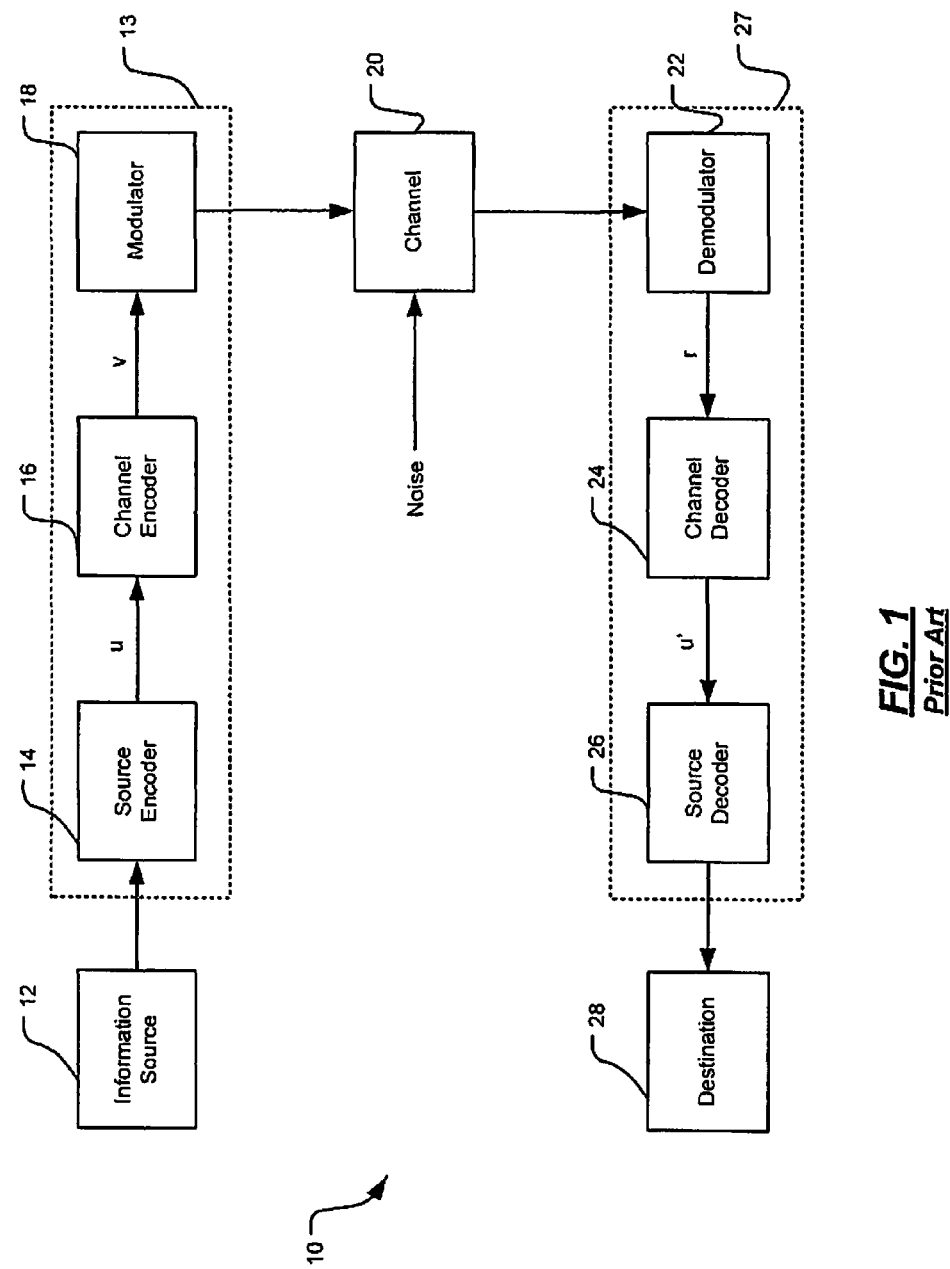
FIG. 1 is a functional block diagram of an exemplary communication system according to the prior art.
Figure 2A:
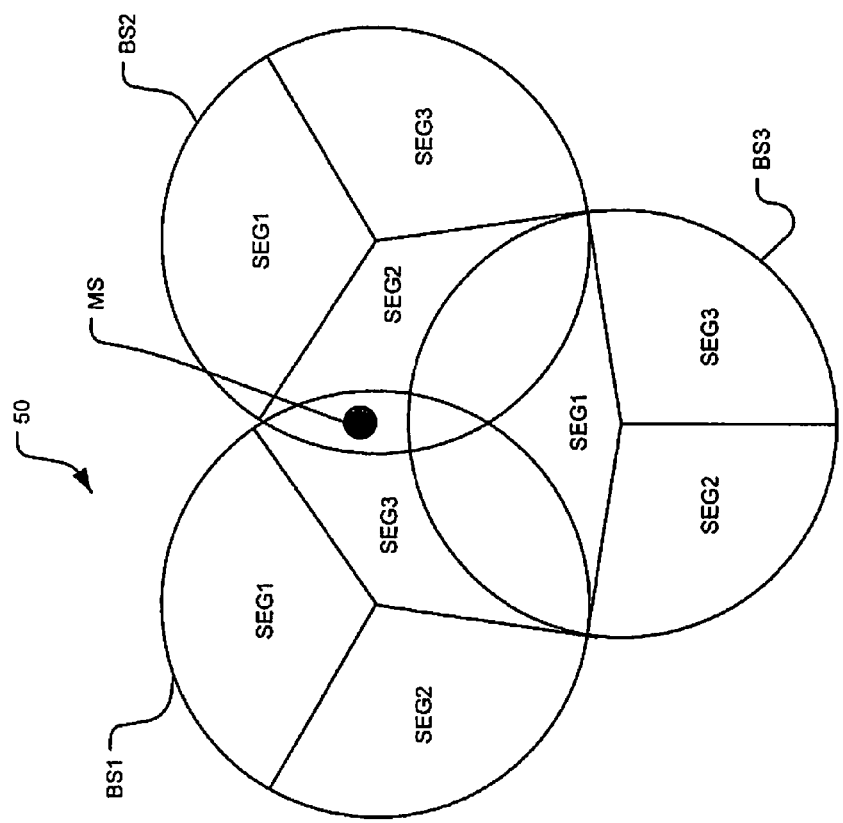
FIG. 2A is a schematic representation of an exemplary wireless communication system including three base stations and a mobile station according to the prior art.
Figure 2B:
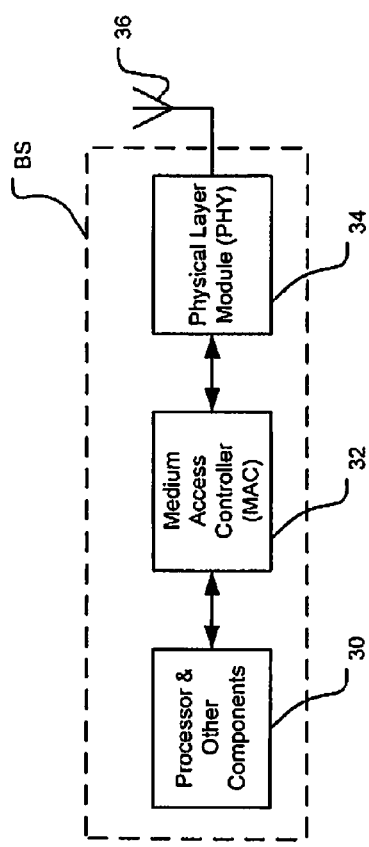
FIG. 2B is a functional block diagram of an exemplary base station utilized in the system of FIG. 2A.
Figure 2C:
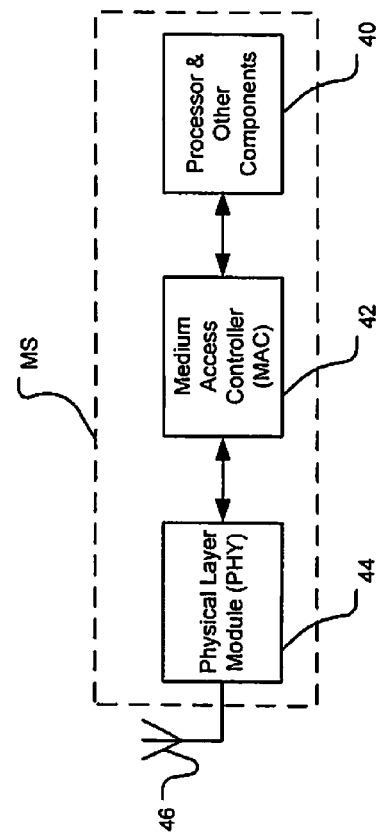
FIG. 2C is a functional block diagram of an exemplary mobile station utilized in the system of FIG. 2A.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 3:
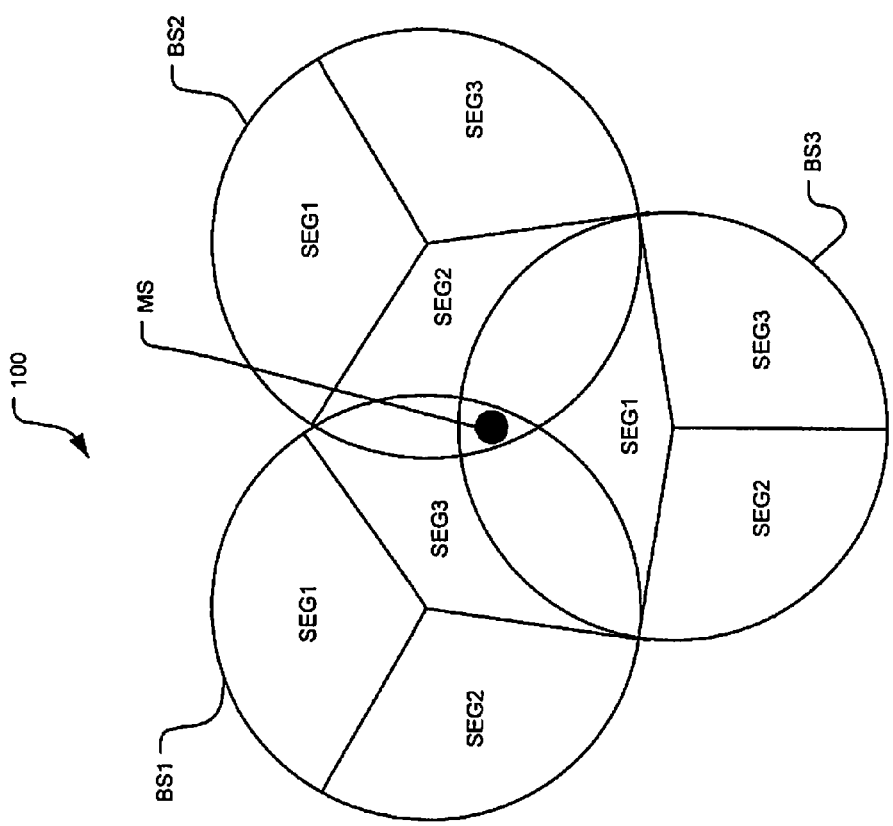
FIG. 3 is a schematic representation of an exemplary wireless communication system including three base stations and a mobile station.

Referring now to FIG. 3, a wireless communication system 100 may include base stations BS1, BS2, and BS3 (collectively BS) and one or more mobile stations (MS). Generally, one MS may communicate with up to three adjacent base stations. Each BS may transmit data that is modulated using an orthogonal frequency division multiplexing access (OFDMA) system.

Specifically, each BS may transmit data in three segments: SEG1, SEG2, and SEG3. The MS, which may move relative to each BS, may receive data from one or more base stations depending on the location of the MS relative to each BS. For example, the MS may receive data from SEG 3 of BS1, SEG 2 of BS2, and/or SEG 1 of BS3 when the MS is located as shown.

When a receiver in the MS is turned on (i.e., when the MS is powered up), the MS may associate with an appropriate segment of a corresponding BS depending on the location of the MS. The MS, however, can process data in a frame transmitted by a BS only if the MS can correctly detect a preamble sequence in the frame. Specifically, the MS can perform frame synchronization and retrieval of a cell ID (IDcell) and a segment number of the BS from the frame if the MS can detect the preamble sequence in the frame.

Referring now to FIG. 4, OFDMA systems may use 1024 and 512 sub-carriers to modulate and transmit data. OFDMA systems using 1024 and 512 sub-carriers are generally referred to as OFDMA systems having 1024 and 512 FFT modes, respectively. Additionally, I.E.E.E. 802.16e supports 128 FFT and 2048 FFT modes.

A total of 114 preamble sequences exist for OFDMA systems that use fast Fourier transforms (FFT) to modulate 1024 and 512 sub-carriers. Each preamble sequence is unique. That is, each preamble sequence is distinct from another preamble sequence and is identified by an index number. The index number may be referred to as preamble sequence index. Each preamble sequence is 284 and 143 bits (symbols) long for 1024 and 512 FFT modes, respectively.

Since one MS may typically communicate with up to three base stations, each BS modulates every third sub-carrier. That is, each BS modulates one of every three sub-carriers. Additionally, each BS uses only one bit of the total bits in a preamble sequence when modulating every third sub-carrier. For example, in 1024 FFT mode, the BS may use bit numbers 1, 2, 3, . . . , etc., of the 284 bits in a preamble sequence to modulate sub-carrier numbers 1, 4, 7, . . . , etc., of the 1024 sub-carriers, respectively.

Each BS may use the same set of sub-carriers. Each segment in a BS, however, uses distinct sub-carriers at least for preamble purposes. For example, for each BS, segment 1 (SEG1) may use sub-carriers 0, 3, 6, 9, . . . , etc.; segment 2 (SEG2) may use sub-carriers 1, 4, 7, 10, . . . , etc.; and segment 3 (SEG3) may use sub-carriers 2, 5, 8, 11, . . . , etc.

Consequently, the MS receives distinct signals from each BS. For example, the MS may receive signals from SEG2 of BS2 on sub-carriers 1, 4, 7, 10, . . . , etc., from SEG1 of BS3 on sub-carriers 0, 3, 6, 9, . . . , etc., and from SEG 3 of BS1 on sub-carriers 2, 5, 8, 11, . . . , etc. Thus, the signals received by the MS may not interfere with each other since their sub-carriers are distinct.

A set of sub-carriers for segment n may be mathematically expressed as follows.

$$PreambleCarrierSet_n = n + 3k$$

where $0 \leq k \leq 283$ for 1024 FFT mode and $0 \leq k \leq 142$ for 512 FFT mode. Additionally, there may be 86 guard sub-carriers on the left and right ends of the spectrum in 1024 FFT mode. In the 512 FFT mode, there may be 42 guard sub-carriers on the left end and 41 guard sub-carriers on the right end.

Typically, when the receiver in the MS is turned on, the MS initially performs symbol timing and carrier frequency synchronization before the MS can detect a preamble sequence. The MS may perform these tasks using a cyclic prefix in the data frame. Thereafter, the MS determines whether a first symbol in the frame is a preamble symbol. If the first symbol is a preamble symbol, then the MS determines which preamble sequence is present in the frame. Once the MS determines the preamble sequence, the MS can associate with a corresponding segment of an appropriate BS.

Symbols in preamble sequences (i.e., preamble symbols) typically have higher energy than data symbols. For example, the energy of the preamble symbols is typically 8/3 times (i.e., 4.26 dB higher than) the energy of data symbols. This is useful in distinguishing preamble symbols from data symbols.

Additionally, the preamble sequences are almost orthogonal. That is, a cross-correlation between any two preamble sequences is very small. For example, the cross-correlation is typically less than 0.2. This is useful in distinguishing individual preamble sequences from one another. As shown in the table in FIG. 4, if the MS detects a preamble sequence having an index 0, then the MS associates with segment 0 of BS having cell ID 0, and so on.

Base stations and mobile stations may be configured to operate in WiMAX wireless networks. WiMAX is a standards-based technology that enables wireless broadband access as an alternative to wired broadband like cable and DSL. WiMAX provides fixed, nomadic, portable, and mobile wireless connectivity without a direct line-of-sight with a base station. WiMAX technology may be incorporated in portable electronic devices such as notebook computers, personal digital assistants (PDAs), etc. The WiMAX standards "Stage 2 Verification And Validation Readiness Draft," Release 1, dated Aug. 8, 2006 and "Stage 3 Verification And Validation Readiness Draft," Release 1, dated Aug. 8, 2006 are incorporated herein by reference in their entirety.

When WiMAX-compliant mobile stations receive signals, a preamble sequence in the received signals can be detected and identified if the channel is known. In that case, the received signals can be equalized by the channel and can be correlated with all preamble sequences to find a match. Alternately, if the preamble sequence received in the received signal is known, the channel can be calculated. In that case, the preamble sequence is initially estimated, and the channel is calculated based on the estimated preamble sequence. In WiMAX systems, however, preamble sequences transmitted by base stations and channel are unknown to the mobile stations.

Figure 5B:
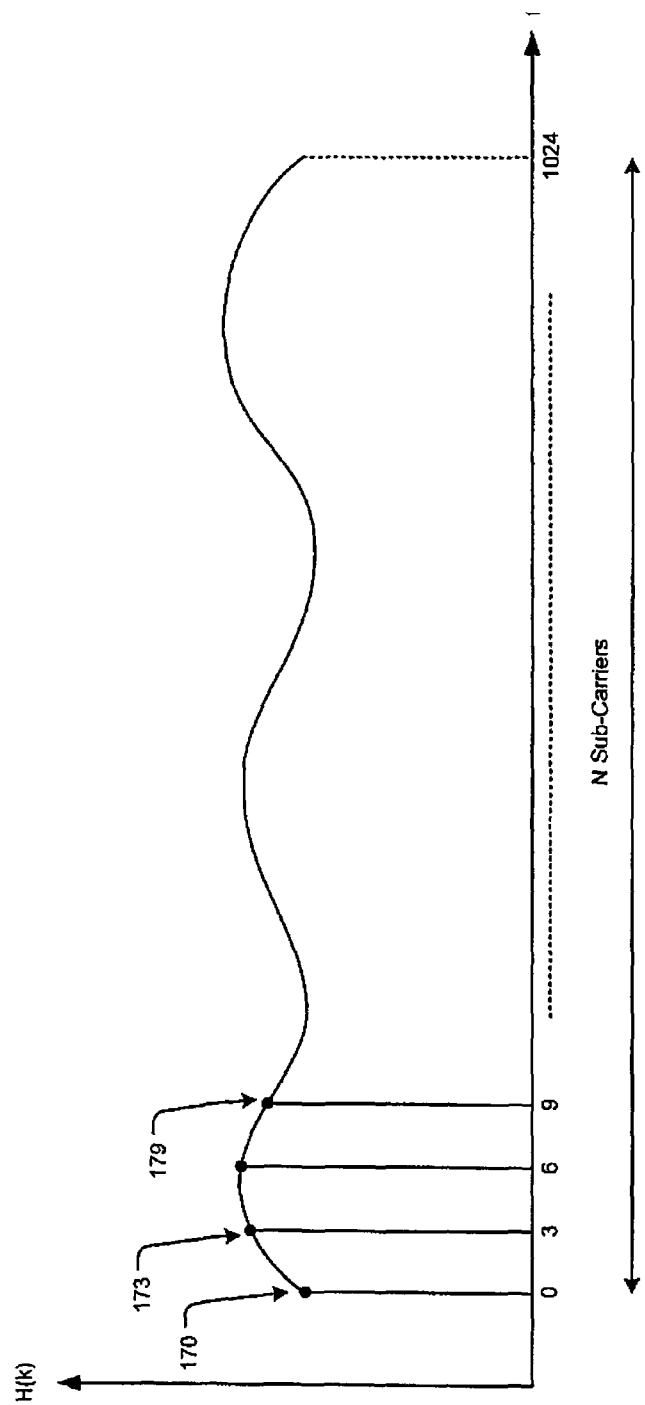
FIG. 5B is a graph of channel gain relative to sub-carrier frequency.

Referring now to FIGS. 5A-5F, a system 160 for jointly estimating both preamble sequence and channel in a mobile station (MS) may be implemented in a physical layer (PHY) module 162 of the MS. The system 160 includes an estimation module 164, a processing module 165, and a control module 166 as shown in FIG. 5A. The estimation module 164 receives an input signal transmitted by a base station (BS). The input signal may be mathematically expressed as follows.

$$Y[k]=H[k]X_i[k]+Z[k]$$

where k is sub-carrier index, i is preamble sequence index, Y[k] is received input signal, H[k] is channel gain, $X_i[k]$ is transmit signal, and Z[k] is noise.

When a preamble bit (i.e., a preamble symbol) in a preamble sequence is 0, the corresponding transmit signal $X_i[k]$ is 1. When a preamble bit in a preamble sequence is 1, the corresponding transmit signal $X_i[k]$ is −1. That is, when a preamble bit in a preamble sequence is 1, the channel phase of the sub-carrier in the transmit signal $X_i[k]$ is shifted by π relative to the channel phase of the sub-carrier when a preamble bit in a preamble sequence is 0.

When input signals have high signal-to-noise ratio (SNR), noise Z[k] may be negligible. In that case, the noise Z[k] may be disregarded, and the channel gain H[k] may be given by the following equation.

$$H[k]=Y[k]/X_i[k]$$

As shown in FIG. 5B, the channel gain H[k] (hereinafter channel) may vary across N sub-carriers, where N=1024 for 1024 FFT mode. The channel, however, may not vary significantly between adjacent modulated sub-carriers. For example, the variation in channel between sub-carriers 0 and 3, between sub-carriers 3 and 6, etc. may be small. In that case, the channel may be considered frequency flat.

Assuming i=0, that is, assuming that the input signal includes a first preamble sequence having an index 0, the estimation module 164 generates preliminary channel estimates $H'_0[k]=Y[k]/X_0[k]$ for each sub-carrier by dividing the input signal Y[k] by the first preamble sequence $X_0[k]$. Thus, the preliminary channel estimate $H'_0[0]$ is an estimate of the channel for sub-carrier 0, the preliminary channel estimate $H'_0[3]$ is an estimate of the channel for sub-carrier 3, etc. In other words, $H'_0[0]$ is the estimate of the channel at point 170, $H'_0[3]$ is the estimate of the channel at point 173, etc. Similarly, the estimation module 164 generates preliminary channel estimates for each i. The i preamble sequences, where 0≤i≤113 for 1024 FFT mode, may be stored in the estimation module 164 or the control module 166.

The processing module 165 processes the preliminary channel estimates and generates processed channel estimates $H''_i[k]$ as follows.

$$H''_i[k]=f(H'_i(0),H'_i(1),\ldots,H'_i(1023)).$$

That is, the processing module 165 generates $H''_i[k]$ for each sub-carrier by processing the preliminary channel estimates $H'_i(0), H'_i(1), \ldots, H'_i(1023)$.

If the channel is frequency flat, the processing module 165 may generate $H''_i[k]$ by generating a weighted average of a predetermined number of sub-carriers that are adjacent to the sub-carrier for which $H''_i[k]$ is calculated. For example, $H''_i[6]$ may be calculated by averaging $H'_i[3]$, $H'_i[6]$, and $H'_i[9]$. Alternately, the processing module 165 may generate $H''_i[k]$ by using a maximum likelihood (ML) estimator, a minimum mean square error (MMSE) estimator, etc.

Figure 5C:
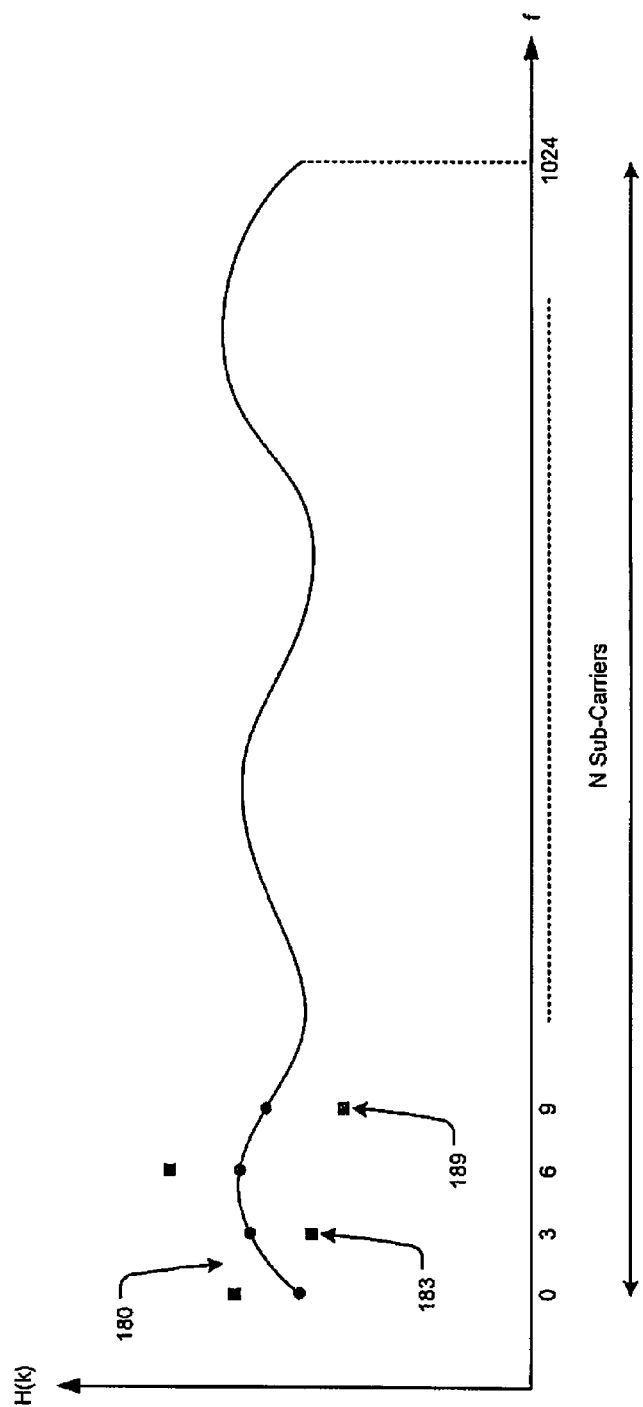
FIG. 5C is a graph of channel gain relative to sub-carrier frequency showing effect of noise on channel gain.
Figure 5D:
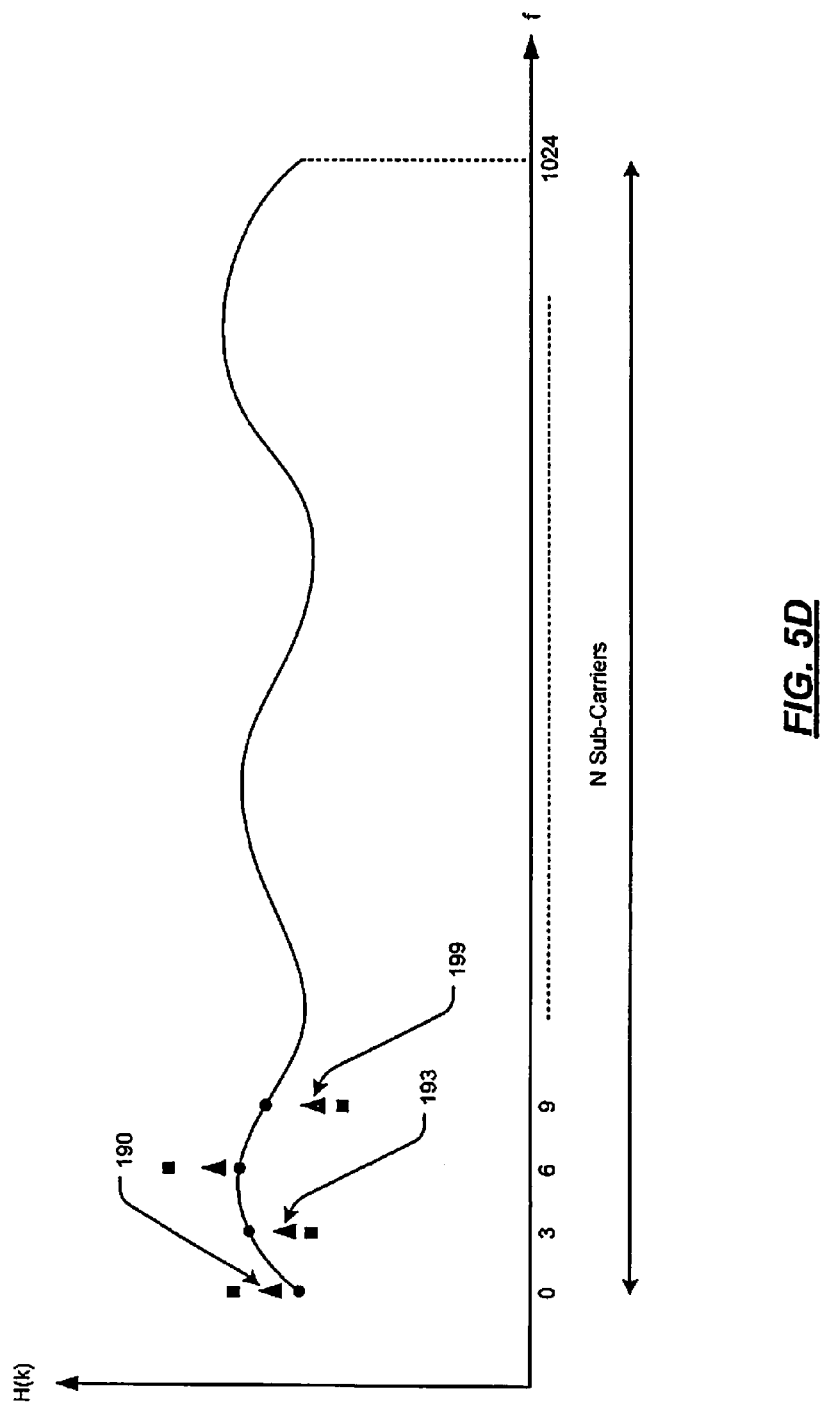
FIG. 5D is a graph of channel gain relative to sub-carrier frequency showing channel gain obtained using weighted average.

As shown in FIG. 5C, the preliminary channel estimates $H'_i[k]$ denoted by squares at 180, 183, . . . , etc. may differ from actual channel values due to noise. In that case, using averaging or other estimators to generate $H''_i[k]$ may improve the estimation as shown in FIG. 5D by triangles at 190, 193, . . . , etc. That is, the processed channel estimates $H''_i[k]$ denoted by triangles may be closer to the actual values of the channel than the preliminary channel estimates $H'_i[k]$ denoted by squares.

If the input signal in fact includes the preamble sequence assumed to be present in the input signal, the values of $H''_i[k]$ may differ only slightly from $H'_i[k]$. That is, the difference between respective processed and preliminary channel estimates (i.e., triangles and squares, respectively) may be minimum, and the difference may represent noise.

Figure 5E:
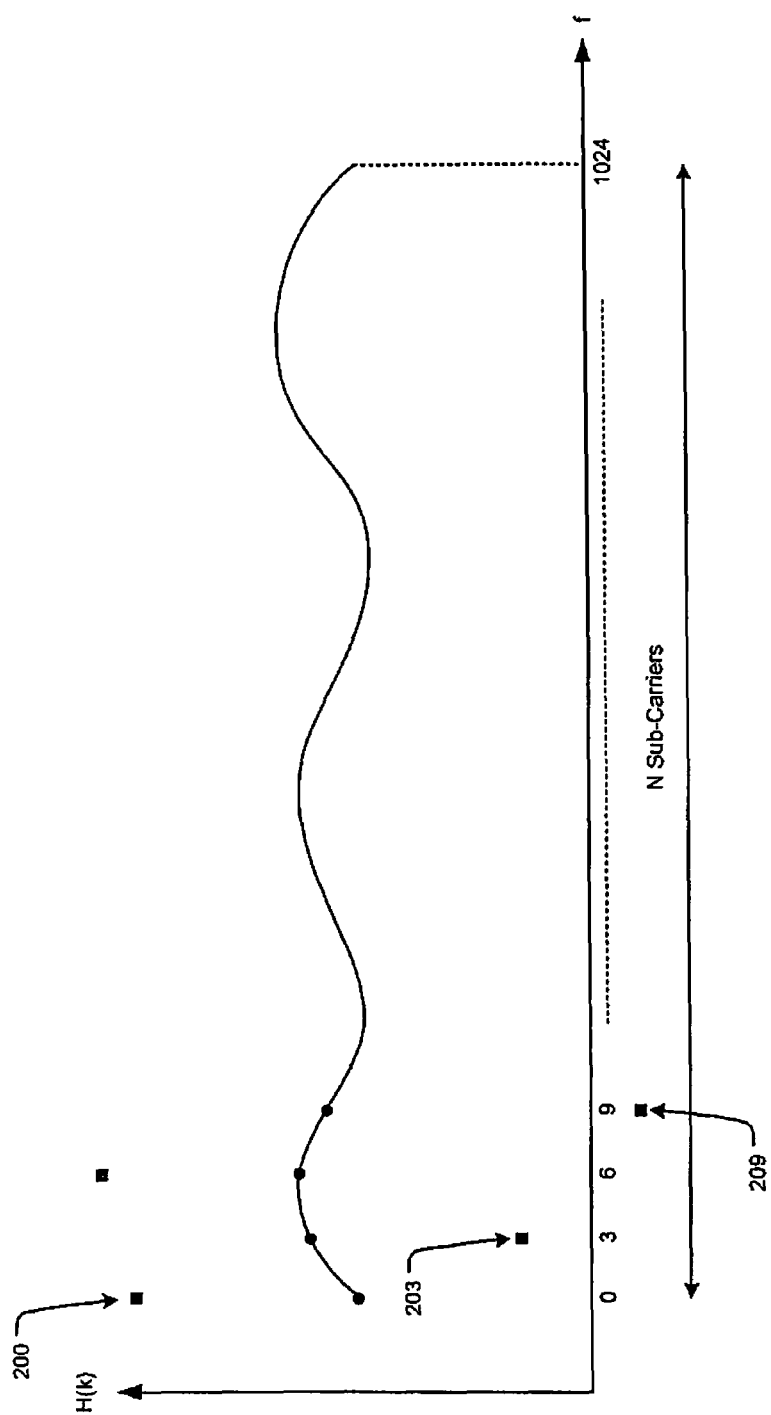
FIG. 5E is a graph of channel gain relative to sub-carrier frequency showing preliminary channel gain estimates when value of i used to estimate channel gain may be incorrect.
Figure 5F:
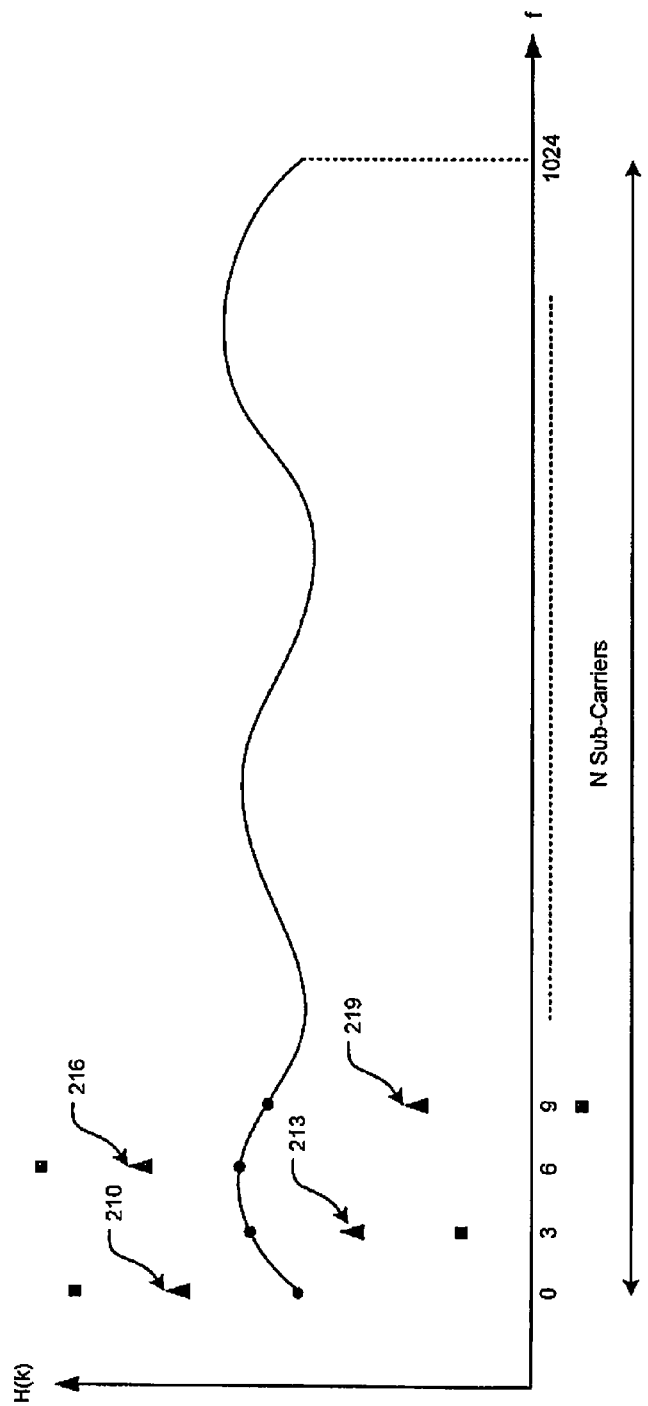
FIG. 5F is a graph of channel gain relative to sub-carrier frequency showing channel gain estimates obtained using maximum likelihood estimator when value of i used to estimate channel gain may be incorrect.

On the other hand, if the input signal does not include the preamble sequence assumed to be present, the values of $H'_i[k]$ denoted by squares at 200, 203, . . . , etc. in FIG. 5E may differ widely from actual channel values as shown. Consequently, the processed channel estimates $H''_i[k]$ denoted by triangles at 210, 213, . . . , etc. in FIG. 5F may also differ widely from $H'_i[k]$ as shown. Thus, the difference between respective processed and preliminary channel estimates (i.e., triangles and squares, respectively) may be high.

The control module 166 calculates the difference between $H''_i[k]$ and $H'_i[k]$, generates an absolute value of the difference (or error in estimates), $|H''_i[k]-H'_i[k]|$, and generates squared error, $|H''_i[k]-H'_i[k]|^2$. Thus, the estimation module 164 generates estimates $H'_i[k]$ for all i, the processing module 165 generates $H''_i[k]$ for all i, and the control module 166 generates $|H''_i[k]-H'_i[k]|^2$ for all i. The control module 166 generates a sum of all $|H''_i[k]-H'_i[k]|^2$ values for each i. The value of i for which the sum of $|H'_i[k]-H''_i[k]|^2$ values is minimum is the estimate for the index i of the preamble sequence present in the input signal received by the MS.

This is mathematically expressed as follows.

$$\hat{i} = \arg\min_i \sum_{k=0}^{N-1} |H''_i[k] - H'_i[k]|^2$$

where N=1024 and 0≤i≤113 for 1024 FFT mode. Additionally, the value of $H''_i[k]$ for which the sum of $|H''_i[k]-H'_i[k]|^2$ values is minimum is the estimate of the channel. Thus, the control module 166 simultaneously estimates the preamble sequence index and the channel. Additionally, since each preamble sequence is unique, the control module 166 implicitly estimates which segment of a base station transmitted the preamble sequence when the control module 166 estimates the preamble sequence index.

Figure 6:
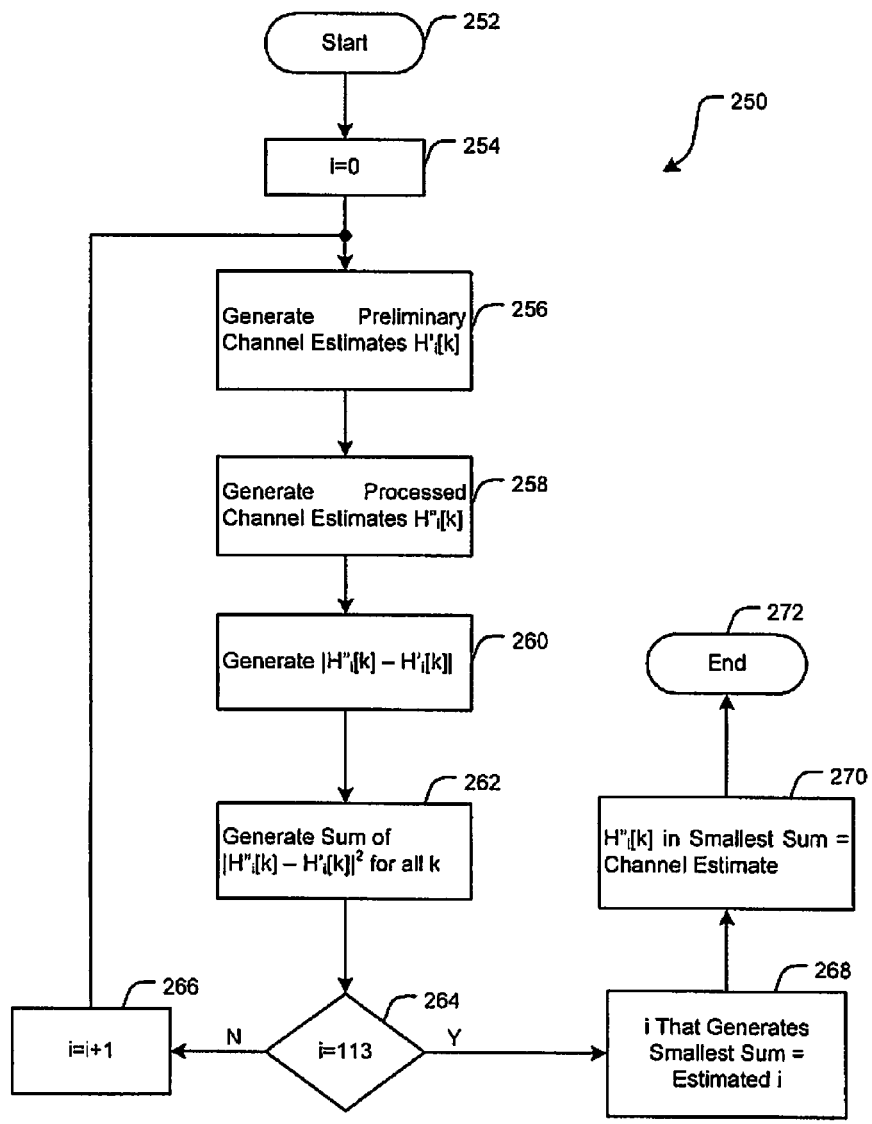
FIG. 6 is a flowchart of an exemplary method for jointly estimating channel gain and preamble sequence according to the present disclosure.

Referring now to FIG. 6, a method 250 for jointly estimating both preamble sequence and channel in an input signal received by a mobile station (MS) begins at step 252. In step 254, a preamble sequence having an index i=0 is assumed to be present in an input signal received by the MS. An estimation module 164 generates preliminary estimates $H'_i[k]$ in step 256. A processing module 165 generates processed estimates $H''_i[k]$ from $H'_i[k]$ using weighted averages, maximum likelihood estimator, or minimum mean square error estimator, etc. in step 258.

A control module 166 generates an absolute value of the difference between processed and preliminary channel estimates $|H''_i[k]-H'_i[k]|$ in step 260. The control module 166 generates a sum of $|H''_i[k]-H'_i[k]|^2$ values for all k in step 262. The control module 166 checks in step 264 if the sum has been calculated for all i. If false, the value of i is incremented in step 266, and steps 256 through 264 are repeated.

If true, the control module 166 estimates in step 268 that the value of i that generated a smallest sum of $|H''_i[k]-H'_i[k]|^2$ values is the preamble sequence index for the preamble sequence present in the input signal. Additionally, the control module 166 simultaneously estimates in step 270 that the value of $H''_i[k]$ in the smallest sum is the channel estimate. The method 250 ends in step 272.

Although the present disclosure describes joint estimation of channel and preamble sequence for mobile stations having a single receive antenna, skilled artisans can appreciate that the joint estimation can be extended to mobile stations having multiple receive antennas. Specifically, for mobile stations having M receive antennas, the preliminary channel estimates may be denoted by $H'_{i,m}[k]$, where m is the antenna index, and he processed channel estimates $H''_{i,m}[k]$ may be expressed as a function of $H'_{i,m}[k]$.

In that case, the value of i for which the sum of $|H'_{i,m}[k] - H''_{i,m}[k]|^2$ values is minimum is the estimate for the index i of the preamble sequence present in the input signal received by the mobile station having M receive antennas. This is mathematically expressed as follows.

$$\hat{i} = \arg\min_{i} \sum_{m=0}^{M-1} \sum_{k=0}^{N-1} |H''_{i,m}[k] - H'_{i,m}[k]|^2$$

where N=1024 and $0 \leq i \leq 113$ for 1024 FFT mode.

The value of $H''_{i,m}[k]$ for which the sum of $|H''_{i,m}[k] - H'_{i,m[k]}|^2$ values is minimum is the estimate of the channel. Thus, the preamble sequence index and the channel can be jointly estimated in mobile stations having multiple receive antennas. Additionally, since each preamble sequence is unique, the joint estimation implicitly estimates which segment of a base station transmitted the preamble sequence when the preamble sequence index is estimated.

As an example, joint estimation of preamble sequence and channel using maximum likelihood (ML) estimator may be mathematically described as follows. The following notational conventions are hereinafter used. An uppercase letter denotes a frequency domain signal, a lowercase letter denotes a time domain signal, and a bold-faced character denotes a random quantity.

An OFDM system transmits information as a series of OFDM symbols. An inverse discrete Fourier transform (IDFT) is performed on N information symbols denoted by X[m, k] for k=0, 1, . . . , N−1, and cyclic prefix samples of length $N_g$ are prepended, where m represents an OFDM symbol number, and k represents a sub-carrier number.

The time domain samples x[m, n] of $m^{th}$ OFDM symbol are expressed as follows.

$$x[m, n] = \begin{cases} \frac{1}{N} \sum_{k=0}^{N-1} X[m, k] e^{j\frac{2\pi k n}{N}} & \text{for } -N_g \leq n \leq N-1 \\ 0, & \text{elsewhere.} \end{cases}$$

The OFDM symbol x[m, n] is transmitted through a channel h[m, n], which may be corrupted by Gaussian noise z[m, n]. The channel h[m, n] is assumed to be block-stationary, i.e., time-invariant during each OFDM symbol. Additionally, the channel h[m, n] is assumed to have finite duration such that h[m, n]=0 for n<0 and for n>$N_g$. Based on these assumptions, an output y[m, n] of a channel may be given by following equation.

$$y[m, n] = \sum_{r=0}^{N_g} h[m, r] x[m, n-r] + z[m, n],$$

where z[m, n] is additive white Gaussian noise (AWGN) with variance $\sigma_z^2$.

Assuming that preamble sequences occupy one OFDM symbol, only one OFDM symbol may be examined for jointly estimating preamble sequence and channel. Since only one OFDM symbol is examined, the OFDM symbol index m is hereinafter omitted.

A received input signal may be expressed in frequency domain as follows.

$$Y[k] = H[k] X_i[k] + Z[k],$$

where Z[k] is Gaussian noise, $X_i[k]$ is $k^{th}$ value of $i^{th}$ preamble sequence, and $$H[k] = \sum_{n=0}^{N_g} h[n] \exp\left(\frac{-j2\pi k n}{N}\right).$$

Alternatively, the received input signal may be represented in a vector-matrix notation by the following equation.

$$Y = X_i H + Z,$$

where $Y = [Y[0]\ Y[1]\ Y[N-1]]^T$, and H and Z are similarly defined. $X_i$ is a diagonal matrix whose diagonal is given by $[X_i[0]\ X_i[1]\ X_i[N-1]]$.

Since H[k] is a discrete Fourier transform of channel h[n] and the channel h[n] is of finite duration, the received input signal can be represented in terms of $h = [h[0]\ h[1] \ldots h[Ng]]^T$ as follows.

$$Y = X_i \sqrt{N} F I_{N,N_g+1} h + Z,$$

where F is a discrete Fourier matrix of size N×N whose element (m, n)$^{th}$ element is $$F_{m,n} = \frac{1}{\sqrt{N}} \exp\left(-\frac{2\pi(m-1)(n-1)}{N}\right).$$

For m≥n, $I_{N,N_g+1}$ is defined as follows.

$$I_{m,n} \triangleq \begin{bmatrix} I_m \\ O_{m-n} \end{bmatrix},$$

where $I_n$ is an identity matrix and $O_n$ is a zero matrix, each of size n×n. On the other hand, for m<n, $$I_{m,n} \triangleq [I_m O_{n-m}].$$

A joint ML estimator for estimating both i and h from Y=Y is given by the following equation.

$$(\hat{h}, \hat{i}) = \arg\max_{(h,i)} f_{Y|h,i}(Y \mid h, i),$$

where $f_{Y|h,i}(Y|h,i)$ is a conditional probability density function of Y given h=h and i=i. Since noise Z is a circularly symmetric complex Gaussian vector whose elements have mean of zero and variance $\sigma_z^2$, the conditional probability density function is given by $$f_{Y|h,i}(Y \mid h, i) = \frac{1}{(\pi\sigma_z^2)^N} \exp\left(-\frac{\|Y - X_i \sqrt{N} F I_{N,N_g+1} h\|^2}{\sigma_z^2}\right).$$

Since an exponential function $e^{-x}$ is a monotonically decreasing function of x, maximizing $f_{Y|h,i}(Y|h,i)$ is equivalent to minimizing the following square error.

$$S(h,i) = \|Y - X_i \sqrt{N} F I_{N,N_g+1} h\|^2$$

Now the problem of finding (h, i) that minimizes S(h, i) can be solved in two steps as follows. In a first step, for each possible i, a channel estimate $\hat{h}(i)$ that minimizes S(h, i) is found. Second, from the $\hat{h}(i)$'s found in the first step, $\hat{i}$ that minimizes $S(\hat{h}(i), i)$ is selected. Additionally, $\hat{h}(\hat{i})$ is selected as an estimate for h. In other words, $$\hat{h}(i) = \arg\min_h \{S(h, i)\},$$

$$\hat{i} = \arg\min_i \{S(\hat{h}(i), i)\},$$

$$\hat{h} = \hat{h}(\hat{i}).$$

and

The channel estimate $\hat{h}(i)$ for a given i that minimizes S(h, i) can be easily derived by solving a least-square estimation problem as follows. Let $$A_i = X_i \sqrt{N} F I_{N,N_g+1}.$$

$$\hat{h}(i) = A_i^\dagger Y,$$

Therefore,
where $A_i^\dagger = (A_i^H A_i)^{-1} A_i^H$ represents a pseudo-inverse of A (i.e., $A^\dagger A = I$), and $A_i$ is a full rank matrix.

A corresponding square error $S(\hat{h}(i), i)$ for the channel estimate $\hat{h}(i)$ is given by $$S(\hat{h}(i),i) = \|Y - A_i A_i^\dagger Y\|^2.$$

Thus, for every i, the square error $S(\hat{h}(i), i)$ is calculated. A preamble sequence index i that minimizes the square error $S(\hat{h}(i), i)$ is selected. A final channel estimate is the channel estimate that corresponds to the preamble sequence index that minimizes the square error. This channel estimate is the channel estimate in time domain. A channel estimate in frequency domain is given by performing fast Fourier transform (FFT) on the channel estimate in time domain. Thus, $\hat{H} = \sqrt{N} F \hat{h}$.

Although ML estimate is described, skilled artisans can appreciate that other estimators may be used to jointly estimate preamble sequence and channel. For example, a minimum mean square error (MMSE) estimator may be used to jointly estimate preamble sequence and channel.

Figure 7B:
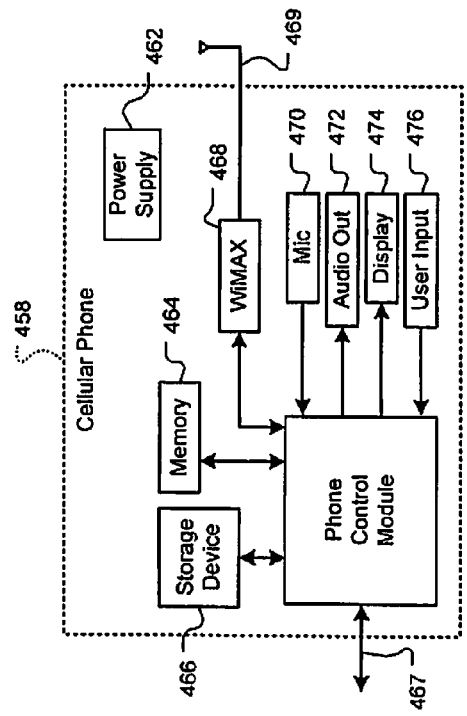
FIG. 7B is a functional block diagram of a cellular phone.
Figure 7A:
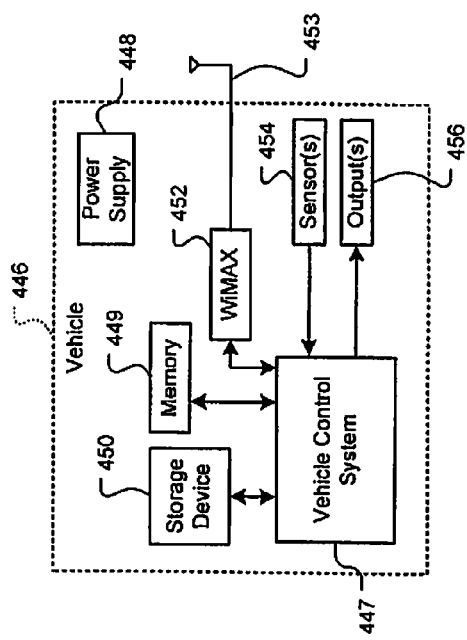
FIG. 7A is a functional block diagram of a vehicle control system.
Figure 7C:
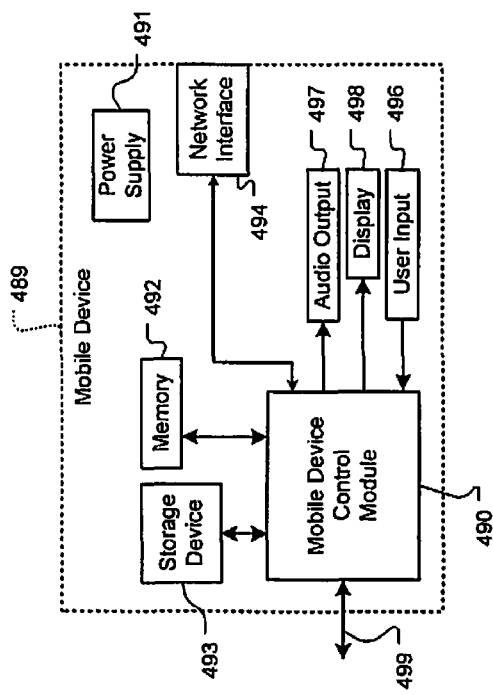
FIG. 7C is a functional block diagram of a mobile device.

Referring now to FIGS. 7A-7C, various exemplary implementations incorporating the teachings of the present disclosure are shown. Referring now to FIG. 7A, the teachings of the disclosure may be implemented in a WiMAX interface 452 of a vehicle 446. The vehicle 446 may include a vehicle control system 447, a power supply 448, memory 449, a storage device 450, and the WiMAX interface 452 and associated antenna 453. The vehicle control system 447 may be a powertrain control system, a body control system, an entertainment control system, an anti-lock braking system (ABS), a navigation system, a telematics system, a lane departure system, an adaptive cruise control system, etc.

The vehicle control system 447 may communicate with one or more sensors 454 and generate one or more output signals 456. The sensors 454 may include temperature sensors, acceleration sensors, pressure sensors, rotational sensors, airflow sensors, etc. The output signals 456 may control engine operating parameters, transmission operating parameters, suspension parameters, etc.

The power supply 448 provides power to the components of the vehicle 446. The vehicle control system 447 may store data in memory 449 and/or the storage device 450. Memory 449 may include random access memory (RAM) and/or nonvolatile memory such as flash memory, phase change memory, or multi-state memory, in which each memory cell has more than two states. The storage device 450 may include an optical storage drive, such as a DVD drive, and/or a hard disk drive (HDD). The vehicle control system 447 may communicate externally using the WiMAX interface 452.

Referring now to FIG. 7B, the teachings of the disclosure can be implemented in a WiMAX interface 468 of a cellular phone 458. The cellular phone 458 includes a phone control module 460, a power supply 462, memory 464, a storage device 466, and a cellular network interface 467. The cellular phone 458 may include the WiMAX interface 468 and associated antenna 469, a microphone 470, an audio output 472 such as a speaker and/or output jack, a display 474, and a user input device 476 such as a keypad and/or pointing device.

The phone control module 460 may receive input signals from the cellular network interface 467, the WiMAX interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the WiMAX interface 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 458.

Referring now to FIG. 7C, the teachings of the disclosure can be implemented in a network interface 494 of a mobile device 489. The mobile device 489 may include a mobile device control module 490, a power supply 491, memory 492, a storage device 493, the network interface 494, and an external interface 499. The network interface 494 includes a WiMAX interface and an antenna (not shown).

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
an input module configured to receive an input signal from a station, wherein the input signal comprises (i) a first preamble sequence, and (ii) a plurality of subcarriers;
a first gain module configured to, based on the input signal, generate first channel gain values, wherein each of the first channel gain values is for a respective one of the plurality of subcarriers;
a second gain module configured to, based on the first channel gain values, generate second channel gain values; and
a preamble estimation module configured to estimate the first preamble sequence based on (i) the first channel gain values, and (ii) the second channel gain values.

2. The system of claim 1, wherein the preamble estimation module is configured to estimate the first preamble sequence based on each of (i) the first channel gain values, and (ii) the second channel gain values.

3. The system of claim 1, wherein the preamble estimation module is configured to estimate the first preamble sequence based on differences between (i) the first channel gain values, and (ii) the second channel gain values.

4. The system of claim 1, wherein:
the input module is configured to receive the input signal on a channel; and
the preamble estimation module is configured to determine a gain value of the channel based on the first preamble sequence.

5. The system of claim 1, wherein the second gain module is configured to generate the second channel gain values based on weighted averages of the first channel gain values.

6. The system of claim 1, wherein the second gain module is configured to generate each one of the second channel gain values by averaging (i) one of the first channel gain values corresponding to the one of the second channel gain values, and (ii) the first channel gain values adjacent to the one of the first channel gain values corresponding to the one of the second channel gain values.

7. The system of claim 1, wherein
the first gain module is configured to
generate the first channel gain values based on a ratio of the input signal to a second preamble sequence, and
generate third channel gain values based on a ratio of the input signal to a third preamble sequence;
the second gain module is configured to generate fourth channel gain values based on the third channel gain values; and
the preamble estimation module is configured to estimate the first preamble sequence based on the fourth channel gain values.

8. The system of claim 7, wherein the preamble estimation module is configured to generate:
first differences between (i) the first channel gain values, and (ii) the second channel gain values;
first squared errors based on squares of absolute values of the first differences;
a first sum of the first squared errors;
second differences between (i) the third channel gain values, and (ii) the fourth channel gain values;
second squared errors based on squares of absolute values of the second differences; and
a second sum of the second squared errors.

9. The system of claim 8, wherein the preamble estimation module is configured to determine (i) if the first sum is less than the second sum, the first preamble sequence to be a same sequence as the second preamble sequence, and (ii) if the second sum is less than the first sum, the first preamble sequence to be a same sequence as the third preamble sequence.

10. The system of claim 1, wherein each of the first channel gain values represents a ratio of the input signal to a signal transmitted by the station to the input module.

11. A method comprising:
receiving an input signal at a first station, wherein the input signal comprises (i) a first preamble sequence, and (ii) a plurality of subcarriers;
based on the input signal, generating first channel gain values, wherein each of the first channel gain values is for a respective one of the plurality of subcarriers;
based on the first channel gain values, generating second channel gain values; and
estimating the first preamble sequence based on (i) the first channel gain values, and (ii) the second channel gain values.

12. The method of claim 11, further comprising estimating the first preamble sequence based on each of (i) the first channel gain values, and (ii) the second channel gain values.

13. The method of claim 11, further comprising estimating the first preamble sequence based on differences between (i) the first channel gain values, and (ii) the second channel gain values.

14. The method of claim 11, further comprising:
receiving the input signal on a channel; and
determining a gain value of the channel based on the first preamble sequence.

15. The method of claim 11, further comprising generating the second channel gain values based on weighted averages of the first channel gain values.

16. The method of claim 11, further comprising generating each one of the second channel gain values by averaging (i) one of the first channel gain values corresponding to the one of the second channel gain values, and (ii) the first channel gain values adjacent to the one of the first channel gain values corresponding to the one of the second channel gain values.

17. The method of claim 11, further comprising:
generating the first channel gain values based on a ratio of the input signal to a second preamble sequence;
generating third channel gain values based on a ratio of the input signal to a third preamble sequence;
generating fourth channel gain values based on the third channel gain values; and
estimating the first preamble sequence based on the fourth channel gain values.

18. The method of claim 17, further comprising generating:
first differences between (i) the first channel gain values, and (ii) the second channel gain values;
first squared errors based on squares of absolute values of the first differences;
a first sum of the first squared errors;

second differences between (i) the third channel gain values, and (ii) the fourth channel gain values;
second squared errors based on squares of absolute values of the second differences; and
a second sum of the second squared errors.

19. The method of claim 18, further comprising determining (i) if the first sum is less than the second sum, the first preamble sequence to be a same sequence as the second preamble sequence, and (ii) if the second sum is less than the first sum, the first preamble sequence to be a same sequence as the third preamble sequence.

20. The method of claim 11, wherein:
the input signal was transmitted from a second station to the first station; and
each of the first channel gain values represents a ratio of the input signal to a signal transmitted by the second station to the first station.

* * * * *